Oct. 5, 1965   F. JONKER   3,209,643
APPARATUS FOR ACCURATELY REGISTERING SUPERIMPOSED FILMS
Filed Nov. 1, 1961

INVENTOR:
F. JONKER

By: Homer R. Montague
ATTORNEY

United States Patent Office 3,209,643
Patented Oct. 5, 1965

3,209,643
APPARATUS FOR ACCURATELY REGISTERING SUPERIMPOSED FILMS
Frederick Jonker, Washington, D.C., assignor to Jonker Business Machines, Inc., a corporation of Delaware
Filed Nov. 1, 1961, Ser. No. 150,114
5 Claims. (Cl. 88—24)

The present invention is an improvement upon an earlier invention of the same title, filed September 10, 1959, Serial #839,242 allowed November 30, 1964. It comprises a number of improvements in the devices for accurate alignment in superimposition of photographically miniaturized term cards.

Briefly, the invention improves the accuracy of alignment of superimposed film records of term cards of the general kind described in said prior application, by providing the films with sprocket holes which are of diamond shape (or square shape turned at an angle). The films are intermittently fed in superposition relative to one another, and between transparent window plates, and are registered accurately by a set of pins or teeth which enter at least some of the approximately-registered sprocket holes. The invention provides mechanism for resiliently urging the pins away from one another after they have entered the sprocket holes, and the pins are of such (triangular) cross-sectional shapes that they engage in corners of the sprocket holes in respective films and thus force the films into precisely aligned condition.

Figure 1:
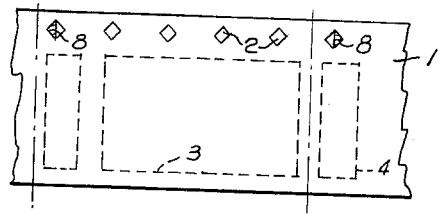
FIG. 1 is a fragmentary plan view of a typical term card film.

Referring to FIG. 1 of the drawings, numeral 1 designates a typical photographically miniaturized term card film in accordance with the invention, 2 designating the diamond-shaped sprocket holes therein. The image area of one term card is indicated by numeral 3, while 4 indicates the area devoted to the name or serial number of a particular term. Film-aligning teeth 8 are indicated as disposed in two of the sprocket holes in the film, these teeth being of triangular shape so that when urged away from one another, they will define an accurate position for the image areas of the film. As indicated below several superimposed films are mutually aligned in this way, FIG. 1 being explanatory of the action.

Figure 2:
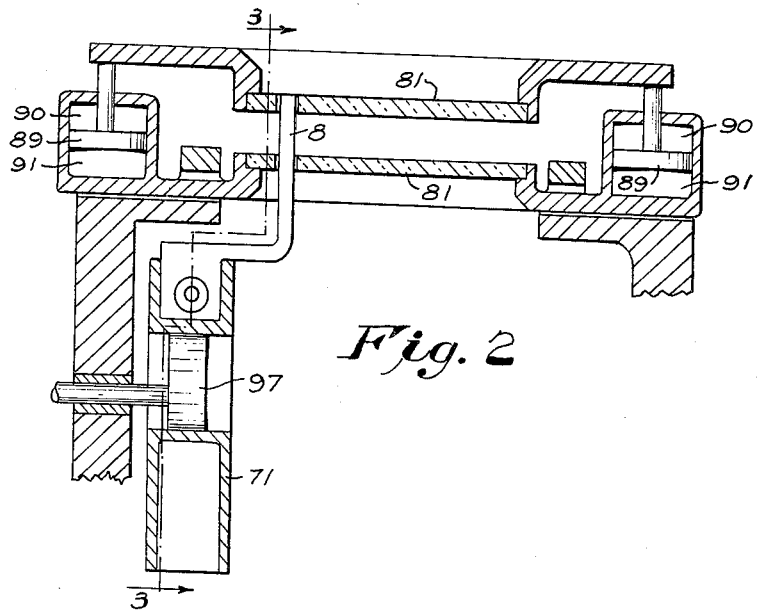
FIG. 2 is a vertical sectional view, with parts omitted for clarity, of a preferred form of the film holding apparatus.
Figure 3:
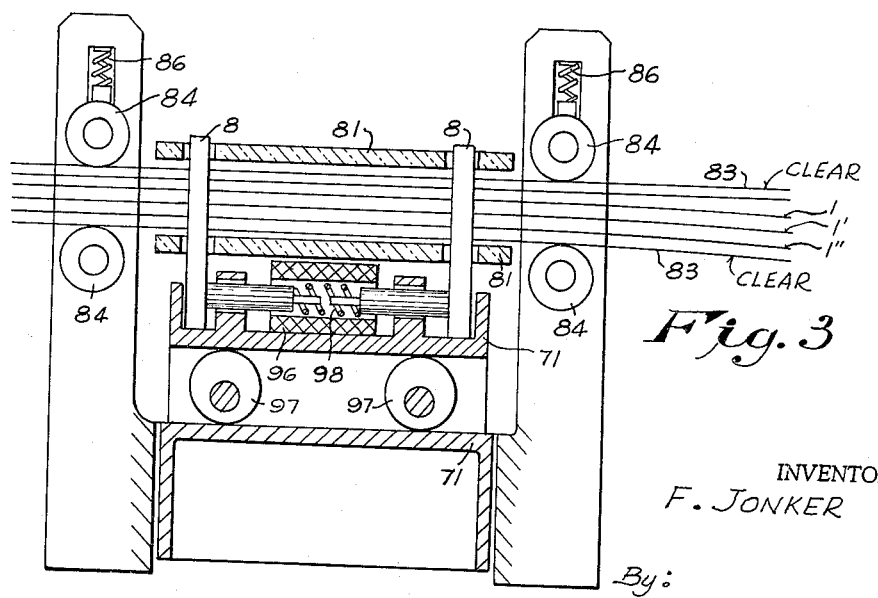
FIG. 3 is a sectional view taken generally along the line 3—3 of FIG. 2.

FIGS. 2 and 3 show two cross sections of a film-transport mechanism based on intermittent film motion. The superimposed films 1, 1', 1" et cetera are advanced frame by frame, for example, by rubber rollers 84 pressing on the film under pressure of springs 86, as shown in FIG. 3, or some other suitable means such as sprocket wheels. For alignment and viewing under alignment, two pins 8 are moved up through sprocket holes. The up-and-down movement of the pins 8 could, for example, be effected by the rotating cams 97 which move body 71, in which the pins 8 are mounted, up and down.

Accuracy of alignment is achieved in the manner shown in FIG. 1, by moving pins 8 in opposite directions. This could, for example, be effected by deenergizing coil 96 which, working against pressure of spring 98, normally pulls the pins 8 towards each other.

For viewing, the filmstrips are clamped together frame by frame between two glass windows 81. This could, for example, be effected hydraulically. By admitting pressure in spaces 90 (FIG. 2) above the pistons 89, the glass windows 81 are pressed together. By admitting pressure in the spaces 91, the windows are again moved apart.

To prevent scratching of the filmstrips having the miniaturized term cards, they will be run between two clear filmstrips 83, which can be replaced when badly scratched.

The invention is not limited to the embodiment shown but comprises all possible embodiments, modifications and variations, as encompassed within the scope of the claims.

I claim:

1. Apparatus for holding in accurately registered relation a plurality of superimposed flat, elongate films all carrying superposable images of data storage spots arranged in a lengthwise succession of predetermined matrix-like arrays, and all of said films having regularly-spaced sprocket-hole perforations, said apparatus comprising:
    (a) at least one pair of window-defining elements mounted for relative motion toward and away from one another to selectively clamp, in intimate surface contact therebetween, a plurality of such films for optical inspection of their superposed images,
    (b) a plurality of tooth elements mounted for movement into and through the approximately-aligned sprocket-hole perforations of films positioned between said window-defining elements, and
    (c) mechanism for positively moving at least some of said tooth elements relative to one another in directions laterally of the major planes of such films, to register said films by positive pressure engagement of said tooth elements with the margins of sprocket hole perforations in all of said films.

2. Apparatus in accordance with claim 1, in which said window-defining elements comprise respective flat transparent plates.

3. Apparatus in accordance with claim 2 in which said plates are carried by respective reciprocable carrier elements to provide said relative motion of said elements.

4. Apparatus in accordance with claim 1, in which said tooth elements comprise at least one pair of relatively movable tooth parts adapted to enter together into a single set of aligned perforations, and in which said mechanism includes means for positively moving said parts toward and away from one another in a direction laterally of their length.

5. Apparatus in accordance with claim 1, in which said tooth elements comprise individual spaced-apart pins adapted to enter respective spaced-apart sprocket-hole perforations of said films, and positive-acting mechanical means for relatively moving said pins eccentrically about their lengthwise axes to register said films.

References Cited by the Examiner

UNITED STATES PATENTS

| | | | |
|---|---|---|---|
| 731,282 | 6/03 | Casler | 95—75 |
| 1,267,411 | 5/18 | Howell | 352—239 |
| 1,561,941 | 11/25 | Merle | 352—235 |
| 1,913,380 | 6/33 | Frappier et al. | 352—229 |
| 1,972,973 | 9/34 | Bauer | 88—24 |
| 2,174,194 | 9/39 | Nemnich | 352—80 |
| 2,525,957 | 10/50 | Schuler | 88—24 |
| 2,556,930 | 6/51 | Miller | 95—75 |
| 2,801,567 | 8/57 | Doorn | 88—24 |
| 2,968,966 | 1/61 | Holmes | 74—426 |

NORTON ANSHER, Primary Examiner.

EMIL G. ANDERSON, WILLIAM MISIEK,
Examiners.